Patented Apr. 13, 1948

2,439,677

UNITED STATES PATENT OFFICE 2,439,677

COATING COMPOSITION COMPRISING A VINYL HALIDE RESIN AND A HYDROXY POLYCARBOXYLIC ACID

Carl L. Shapiro, Crafton, Pa., assignor, by mesne assignments, to Lynnwood Laboratories, Inc., Newark, N. J., a corporation of New Jersey No Drawing. Application July 31, 1942, Serial No. 453,056

13 Claims. (Cl. 260—41)

This application is a continuation-in-part of my applications Serial Numbers 327,738, filed April 3, 1940, and 331,112, filed April 23, 1940, both now abandoned.

The present invention relates to compositions containing vinyl halide resins. Vinyl halide resins have been on the market for a number of years and have been applied for various purposes in industry. Coating compositions based on these resins have found considerable application because of a number of very desirable properties. Since the resins are tasteless they have been used for lining containers intended for substances such as foods, juices and beverages. Since the resins are quite resistant to alcohol and numerous other solvents they have often found application for finishing various types of furniture such as household, hotel and hospital furniture. Vinyl resin-containing coatings furthermore are resistant to the actions of alkalies, acids and most of the corrosive chemicals found in industry. They also resist moisture, grease, humidity, etc. and are hard and abrasion-resistant and withstand weathering conditions in a superior manner. However, vinyl halide resin compositions have heretofore been limited in use because of the incompatibility of vinyl halide resins with certain materials and metals. It has not been possible to apply them directly to surfaces containing zinc, tin or iron for they tend to become darkened or black when applied directly to these surfaces. It is customary to bake vinyl halide resins in order to cause them to become resistant to corrosion and usually higher temperatures or longer times of baking create more resistance. The objectionable blackening is considerably accelerated and enhanced by the baking process. It usually occurs either during the baking operation or shortly thereafter. The blackening effect has not only been found to exist between the metals themselves and the vinyl halides but also with compounds of the metals. Since pigments containing zinc and iron compounds especially are often quite cheap and otherwise desirable, this has been a definite disadvantage in the use of vinyl halide resins.

Some attempt has been made to remedy the blackening effect by adding pigments which appear to have a stabilizing action and hinder it. Pigments such as, for example, blue lead, litharge and lead chromate appear to reduce the tendency toward blackening, but the effectiveness of these pigments appears to depend to a large extent upon the amount introduced, most effective stabilization requiring the introduction of large amounts. This not only increases the cost of the finished coating compositions, but the introduction of these pigments, which are of dark color, for the most part, renders it impossible to obtain light or pastel shades as they mask any light-colored pigments used.

It is an object of the present invention to produce a vinyl halide resin coating composition which shows considerable improvement over the disadvantages of prior art coating compositions enumerated above.

It is also an object of this invention to provide a stable vinyl resin composition on zinc, iron or tin containing surfaces or including zinc or iron pigments.

I have found that ordinary vinyl halide resin compositions as previously used may be made compatible with zinc, iron and the like, and compounds thereof, by mixing with them a carboxylic acid having in addition to one carboxyl group at least one other of a carboxyl or a hydroxyl group. All these acids may be employed but the group of hydroxy polycarboxylic acids is somewhat to be preferred. Organic acids of either aliphatic or aromatic types may be employed. As purely exemplary of these acids, a number which have been found entirely satisfactory are malic, hydroxy butyric, oxalic, citric, lactic, tartaric, succinic, salicylic and maleic.

The amount of carboxylic acid which it is necessary to add to the vinyl halide resin varies depending upon the type of composition and the acid employed. In accordance with the present invention an amount of acid is employed sufficient to resist substantially blackening of the composition when it is baked on an iron, zinc or tin surface. Generally speaking, for normal baking conditions which usually range from about 20 minutes at 300° F. to about 20 minutes at 375° F. depending upon the type and thickness of material and the type of oven involved, 0.5% or in some cases even less than 0.1% of acid is sufficient to provide a suitable coating. If more severe baking conditions of temperature and/or time are employed, more acid should be incorporated to obtain the best composition.

A number of types of vinyl halide resin may be used in the present invention, and resins which contain vinyl halide resins mixed with other resins such as, for example, methacrylate resins or vinyl esters, are very suitable for use in this invention. One mixed vinyl resin which has been found very suitable for coating compositions of the present invention is formed by polymerization of a mixture of vinyl halide and a vinyl ester in varying proportions. For example, one may take 80 parts by weight of vinyl chloride, 20 parts by weight of vinyl acetate in the presence of one part of benzoylperoxide in a suitable amount of toluol as a solvent. This mixture is heated to a temperature of 40 to 60° C. in an autoclave for about 24 hours. A reaction takes place and the resin forms. A number of vinyl halide type resins have been developed in the art. All are well known and may be used in the present invention. The resins may be dissolved in solvents in customary manners when producing a coating composition.

The method of obtaining the mixture of vinyl halide resin and acid is not in general important. Any convenient technique may be employed. For example, one may add powdered dry acid to powdered dry resin, or one may add a solution of acid to dry resin or one may add dry acid to a solution of resin, or again a solution of acid and a solution of resin may be mixed. Also, the acid may be added to the resin with lacquer-forming ingredients. It is desirable that relatively uniform distribution of the acid throughout the resin be employed.

Compositions of the present invention may have added to them any desired pigments, including not only iron and zinc pigments such as iron oxides, zinc oxides and mixed pigments containing iron and zinc compounds, but also pigments of various other characters, as, for example, titanium, lead or the like, pigments. Nor is it necessary that compositions of the present invention be coated only on base materials containing zinc or iron or tin. They may be used to advantage on base materials of other metals, as, for example, aluminum, copper, brass and various alloys of these and other metals. Or, again, they may be used for coating upon non-metallic surfaces, as, for example, glass, porcelain, molded resins and the like.

The following examples show a few embodiments of the invention.

*Example 1*

There was provided a solution including 12 grams of vinyl halide containing resin dissolved in 60 cc. of butyl acetate. To that solution was added 100 cc. of a mixture of toluol and benzol. There was also provided a solution containing 3 grams of citric acid dissolved in 100 cc. of ethyl alcohol. The two solutions were mixed and the composition coated on a black iron sheet. The solvent was evaporated and the coated iron baked at a temperature of 320° F. for about eleven minutes. This treatment hardened the vinyl resin and made the same resistant as noted above. A second experiment was conducted using the vinyl halide resin solution described above but without the addition of the citric acid solution. The treatment of the black iron sheet with this vinyl halide composition was identical and simultaneous with the aforesaid iron sheet. After the baking operation was completed the unmodified vinyl resin coating had turned a dark gray, verging on black. This was sharply contrasted with no discoloration or decomposition at all in the modified vinyl halide resin composition which remained clear and colorless after the baking was completed.

*Example 2*

A composition was prepared including 16 grams of vinyl halide containing resin dissolved in 60 cc. of methyl butyl ketone and having added thereto 50 cc. of a toluol diluent. 2 grams of tartaric acid was dissolved in 30 cc. of a mixture of equal parts of methyl and ethyl alcohols. The two solutions were mixed and the composition was sprayed on to the surface of the zinc die casting. After evaporation of the solvent the zinc casting was baked at a temperature of 375° F. for six minutes. No decomposition and no discoloration of the coating took place. It was as clear and colorless as the unbaked coating before the heat treatment.

*Example 3*

A solution was made with 18 grams of vinyl halide containing resin, 50 cc. of acetone and 15 cc. of toluol. 4 grams of lactic acid in the solid state were mixed with the solution and the two were ground together until the lactic acid was uniformly disseminated throughout the composition. A tinned iron plate was then brushed with the composition until the surface was uniformly coated. The solvent was removed and the article was baked at 345° F. for about eight minutes. The final baked product was clear and colorless and was perfectly satisfactory.

*Example 4*

A composition was made similar to that described in Example 1, containing citric acid, and into the composition was incorporated 5 grams of zinc chromate. The incorporation of said pigment was in accordance with the usual practice in a suitable mill. The composition was brushed on to a black iron sheet which was then baked at 325° F. for about ten minutes. At the termination of the treatment there was no evidence of any change in the color of the composition, and preservation of the vinyl resin was accomplished.

*Example 5*

20 grams of a vinyl resin was provided, said resin consisting of a mixed condensation product of vinyl chloride and vinyl acetate in equal proportions by weight. This product was employed in a powdered state of fineness of 10 to 20 mesh. It had a softening point of about 128° C. To the powdered resin was added 15 cc. of a 5% solution of tartaric acid in ethyl alcohol with continuous stirring, the addition being made gradually over a period of 5 to 10 minutes. The mixed composition was then evaporated at a low temperature in order to remove the alcohol from the mass. If agglomeration of the particles takes place during this operation it is advisable to subject the powdered material to a short grinding operation. The composition so formed was completely stable and even upon standing for a relatively long period of time no deterioration or appreciable change in the character of the resin takes place. When it is desired to use this composition it should be dissolved in the usual solvents in suitable amount with or without the addition of any other desired ingredients such as pigments, plasticizers, modifying agents. Such a solution was sprayed on the zinc article and baked for fifteen minutes at a temperature of 330° F. This time of treatment was about twice that normally used in the baking of resins of this type. However, at the end of the operation the resin was clear and showed not the slightest evidence of discoloration or other signs of deterioration. In further tests the article so treated was baked at 355° F. for ten minutes at the end of which time the article was still in perfect condition.

For comparative purposes, the resin set forth above but not treated with any acid was made into a coating composition with the same solvents and the same proportions as the treated resin and a coating was made on a zinc article. The coating was baked for a period of three minutes at 330° F. At the end of this short period of time breakdown of the resin had definitely taken place and the discoloration was quite pronounced. For all practical purposes the coated article was useless.

*Example 6*

20 grams of the condensation product of vinyl chloride in the powdered state and of a fineness of about 20 mesh was mixed with 1 gram of powdered citric acid. The two powders were stirred in a suitable mixing device until the acid was uniformly disseminated throughout the resin. The composition was dissolved in suitable solvents to form a coating composition which was then sprayed upon an iron surface. The solvents were evaporated. The article was baked at a temperature of 365° F. for seven minutes. The treatment caused the resin to become permanently hard, adherent and tough. There was no deterioration or discoloration of the surface.

*Example 7*

In order to determine the amount of stabilization effected with small quantities of organic carboxylic acid under relatively severe baking conditions, three different acids were incorporated with a vinyl halide resin base lacquer in varying amounts. The different lacquers were poured on to iron plates and baked for thirty minutes at 350° F. The results obtained are tabulated below. In the table, B indicates a pour which turned black; SLB indicates one in which there was substantially less blackening of the coating; and C indicates one which remained clear.

*Amount of acid—%*

| Acid | None | 0.1 | 0.5 | 1.0 | 5.0 | 15 | 20 | 30 |
|---|---|---|---|---|---|---|---|---|
| Citric | B | B | C | C | C | C | C | C |
| Tartaric | B | SLB | C | C | C | C | C | C |
| Malic | B | SLB | C | C | C | C | C | C |

In some of these cases large excesses of acid produced some yellowing of the coating.

The exact order of procedure and the proportions of the ingredients may be varied at will as a wide range of variation of such factors may be used with excellent results.

What is claimed is:

1. A coating composition which comprises a vinyl halide resin and a solvent and having incorporated therewith a hydroxy polycarboxylic acid in quantity sufficient to resist substantially blackening of the coating when the composition is baked on a surface selected from the class consisting of iron, zinc, and tin surfaces.

2. A metal surface selected from the class consisting of iron, zinc, and tin surfaces having baked thereon a coating which comprises a vinyl halide resin having incorporated therewith a hydroxy polycarboxylic acid in quantity sufficient that blackening of the coating has been substantially resisted.

3. A coating composition which comprises a vinyl halide resin and a pigment selected from the class consisting of iron, zinc, and tin compound pigments, having incorporated therewith a hydroxy polycarboxylic acid in quantity sufficient to resist substantially blackening of the coating composition on baking.

4. A composition of matter suitable for preparing a coating composition which comprises a vinyl halide resin having incorporated therewith a hydroxy polycarboxylic acid in quantity sufficient to resist substantially blackening of the coating when the composition is baked in contact with a surface selected from the class consisting of iron, zinc, and tin surfaces.

5. A coating composition according to claim 1 in which the carboxylic acid is citric acid.

6. A coating composition according to claim 1 in which the carboxylic acid is tartaric acid.

7. A coating composition according to claim 1 in which the carboxylic acid is malic acid.

8. A composition of matter according to claim 4 in which the carboxylic acid is citric acid.

9. A composition of matter according to claim 4 in which the carboxylic acid is tartaric acid.

10. A composition of matter according to claim 4 in which the carboxylic acid is malic acid.

11. A metal surface according to claim 2 in which the carboxylic acid is citric acid.

12. A metal surface according to claim 2 in which the carboxylic acid is tartaric acid.

13. A metal surface according to claim 2 in which the carboxylic acid is malic acid.

CARL L. SHAPIRO.

REFERENCES CITED

The following references are of record in the file of this patent:

UNITED STATES PATENTS

| Number | Name | Date |
|---|---|---|
| 2,137,627 | Reed | Nov. 22, 1938 |

FOREIGN PATENTS

| Number | Country | Date |
|---|---|---|
| 454,232 | Great Britain | Sept. 25, 1936 |